Patented Feb. 18, 1936

2,030,965

UNITED STATES PATENT OFFICE 2,030,965

EMULSIFIER

Forest H. Clickner, Chicago, Ill., assignor to Kraft-Phenix Cheese Corporation, Chicago, Ill., a corporation of Delaware No Drawing. Application May 13, 1935, Serial No. 21,192

6 Claims. (Cl. 167—91)

I have made the surprising discovery that whey from which the lipoid fraction has been substantially removed, particularly whey powder, constitutes a valuable emulsifying agent in many different industrial applications. For example, such material, when added to egg white, which is normally of no value as an emulsifier, renders the same substantially equal to egg yolk, which is normally an excellent emulsifier, or it may be added to whole egg material to render the same of equal value to egg yolk. Ordinarily, whole egg material is sold for use as an emulsifier in the manufacture of mayonnaise, etc., and the price thereof computed on the basis of the yolk content, the egg white being considered merely as an aqueous diluent. Addition of my improved emulsifier to whole egg thus greatly increases the value of such material by rendering the same equivalent to pure egg yolk.

My improved emulsifier is also of value in the manufacture of emulsified products other than food compounds. For example, I have found that said material is of considerable value as an emulsifier in the manufacture of so-called "brushless" (non-soapy) shaving creams. Such creams normally consist of a highly whipped emulsion of an oily ingredient and water, stearic acid being commonly used as the emulsifying agent. Stearic acid, however, is not entirely satisfactory, because of its lack of water solubility. My improved emulsifier, on the other hand, is highly soluble in water and may be substituted in the usual formulas for compositions of this type for all or part of the usual emulsifying agent.

Preparation of the emulsifying agent

In preparing the lipoid-free whey I may start either with ordinary hygroscopic whey powder or with a non-hygroscopic whey powder produced by the process disclosed in Simmons Patent No. 1,763,633, dated June 10, 1930, or Eldredge Patent No. 1,923,427, dated August 22, 1933, or by any other suitable process. In any event, the whey powder, which should be in finely pulverulent condition, say, about 180 mesh, is extracted with a suitable fat solvent, such as isopropyl alcohol, ether, etc. Sufficient solvent is added to the whey powder to wet it and form a paste. The solvent is then removed, as by placing the material in a basket-type of centrifuge and whizzing until most of the solvent is eliminated, carrying with it the major portion of the lipoid fraction. Possibly 90 per cent of the lipoid is thus removed from the whey powder. The residual whey powder may then be placed in trays and dried at or about room temperature. The drying operation usually requires approximately an hour.

Where ordinary or hygroscopic whey powder is used as the starting material, the extraction step results in converting this material into the non-hygroscopic form, probably due to the presence of small quantities of moisture in the solvent which are taken up by the hygroscopic lactose. This conversion of the hygroscopic whey powder to the non-hygroscopic form is of considerable value because, in the latter condition, it may be kept and transported in non-air tight containers without danger of caking or lumping and, therefore, may be used with the greatest ease.

The dry material obtained as described above is crumbled to a fine powder. The result is substantially lipoid-free non-hygroscopic whey powder. This material may be used as an emulsifier for various materials and will function of itself to emulsify oil and water mixtures in which vegetable or mineral oil is present in a proportion up to approximately 80 per cent. My improved emulsifier may be used in the manufacture of various types of emulsified products, both edible and inedible. As examples of these two classes of products I have mentioned mayonnaise and shaving creams.

One application of this product is in connection with eggs which are used commercially in the manufacture of such emulsified materials as mayonnaise. This phase of my invention will now be described.

Egg product

Whole eggs are removed from the shells and are preferably strained. Approximately 10 pounds of the lipoid-free whey powder, produced as described above, are added for each 80 pounds of whole-egg material (whites and yolks). The material is then mixed and stirred thoroughly, although it is not necessary to homogenize. Such mixing may take place at or near room temperature.

The material may then be placed in cans or other suitable receptacles and is frozen. It is preferably initially brought down to a temperature of about −10° F. After the initial freezing it may be stored at temperatures of, say, 20 to 23° F., until required for use.

The frozen whole egg product described above may be used in the manufacture of mayonnaise, after it has been thawed, in the usual manner in which egg or egg yolks are used, and it is found that my improved whole egg product will function as a highly efficient emulsifier fully equivalent to pure yolk material.

Egg whites alone may be treated by the addition of the improved whey powder and may thus be made the equivalent of egg yolk, as far as emulsifying power is concerned. However, in ordinary commercial practice, it will be more expedient to treat the whole-egg material.

Shaving cream

As stated above, my improved emulsifier may be used in brushless shaving creams in lieu of the emulsifying agent heretofore used in such materials, said emulsifier usually being stearic acid. My improved emulsifying agent may be substituted in the usual formula, or in substantially any formula for goods of this type, for the emulsifier called for by the formula, up to about 10 per cent by weight of the lipoid-free whey powder, based on the weight of the finished shaving cream, and obtain excellent results. The following formulas are given merely as examples and are in no sense limiting:

Example 1

| | Parts by weight |
|---|---|
| Stearic acid | 13 |
| Lipoid-free whey powder | 7 |
| Glycerin | 6 |
| Ammonia (10 per cent solution) | 3 |
| Water | 80 |

Example 2

| | Parts by weight |
|---|---|
| Stearic acid | 13 |
| Lipoid-free whey powder | 7 |
| Glycerin | 5 |
| Potassium hydroxide | 1.5 |
| Water | 80 |

The whey powder is dissolved in the glycerin and aqueous ingredients and admixed with the other constituents at a temperature of about 80° C. The admixture is then whipped in any suitable apparatus, such as a Hobart whipper, until it has attained a creamy consistency of the desired texture.

The lipoid-free whey powder embodying my invention may be used as an emulsifier in oil-water systems in various other industrial applications, which will be readily apparent to those skilled in the art.

Various modifications and variations coming within the spirit of my invention will no doubt suggest themselves to those skilled in the art and, hence, I do not wish to be limited to the specific embodiments disclosed above but wish the scope of my invention to be determined by reference to the appended claims, which are to be construed as broadly as the state of the art will permit.

I claim as my invention:

1. An emulsifier for oil-water systems, comprising whey powder substantially free of lipoid.

2. An emulsifier for oil-water systems, comprising a non-hygroscopic whey powder substantially free of lipoid.

3. A method of preparing an emulsifying agent, comprising extracting whey powder with a lipoid solvent so as to remove the major portion of the lipoid originally present in said whey powder.

4. A method of treating hygroscopic whey powder, comprising extracting the same with a fat solvent containing a small proportion of water so as to remove the major portion of lipoid from said powder and to render the same substantially non-hygroscopic.

5. A stable oil-water emulsion produced in the presence of a relatively small quantity of whey powder substantially free of lipoid, said whey powder acting as an emulsifier.

6. A stable shaving cream of the brushless type consisting essentially of an aerated aqueous emulsion of an oil containing whey powder substantially free of lipoid, said whey powder acting as an emulsifier.

FOREST H. CLICKNER.